Oct. 26, 1965        G. M. SORENSEN        3,213,828
SWINE PRODUCTION UNIT
Filed Oct. 18, 1962                        6 Sheets-Sheet 1
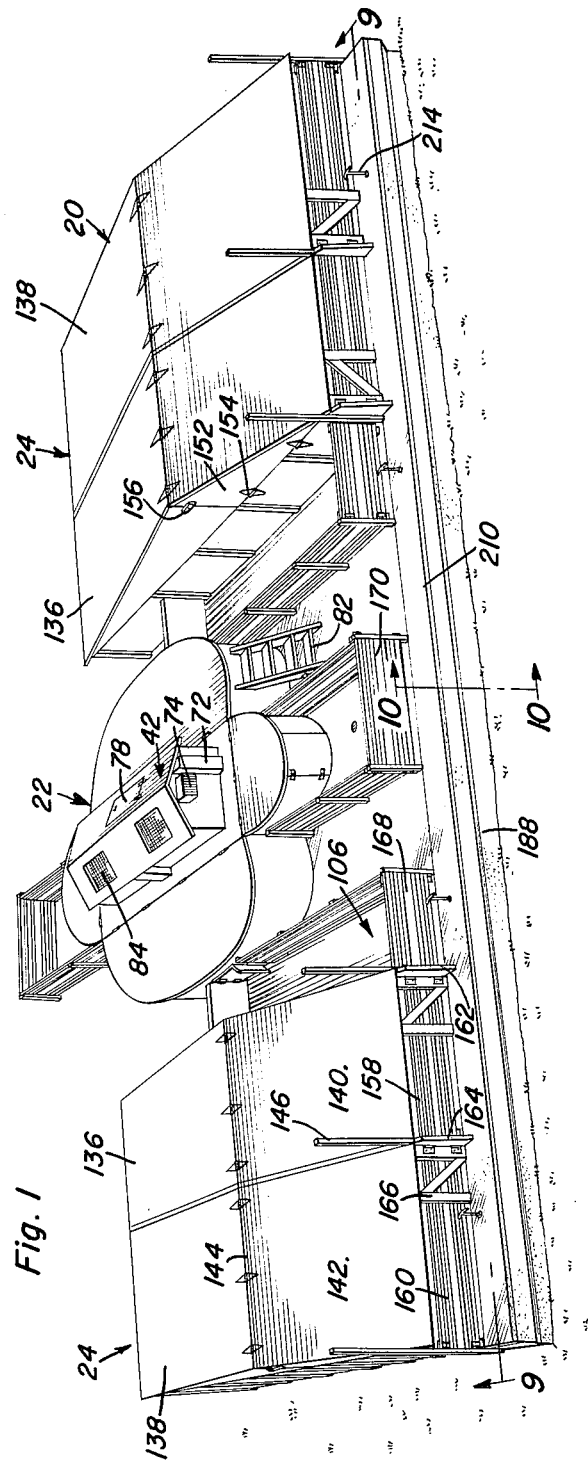
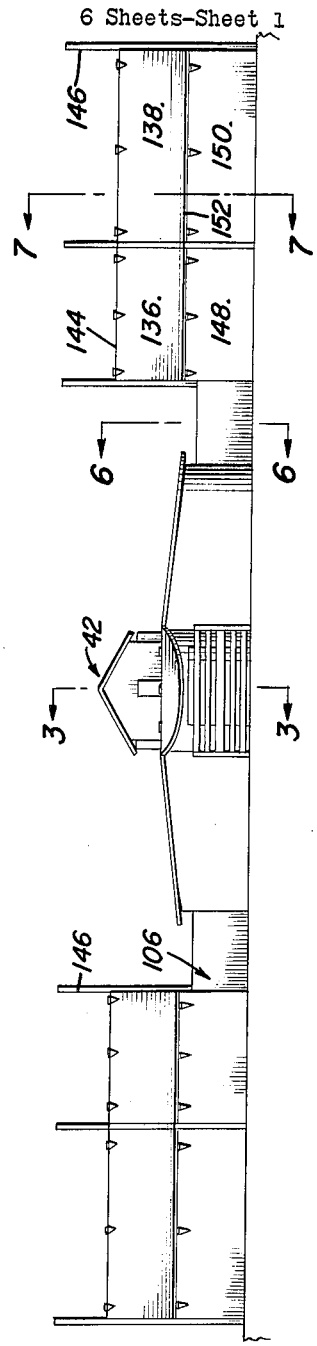
Glenn M. Sorensen
INVENTOR.

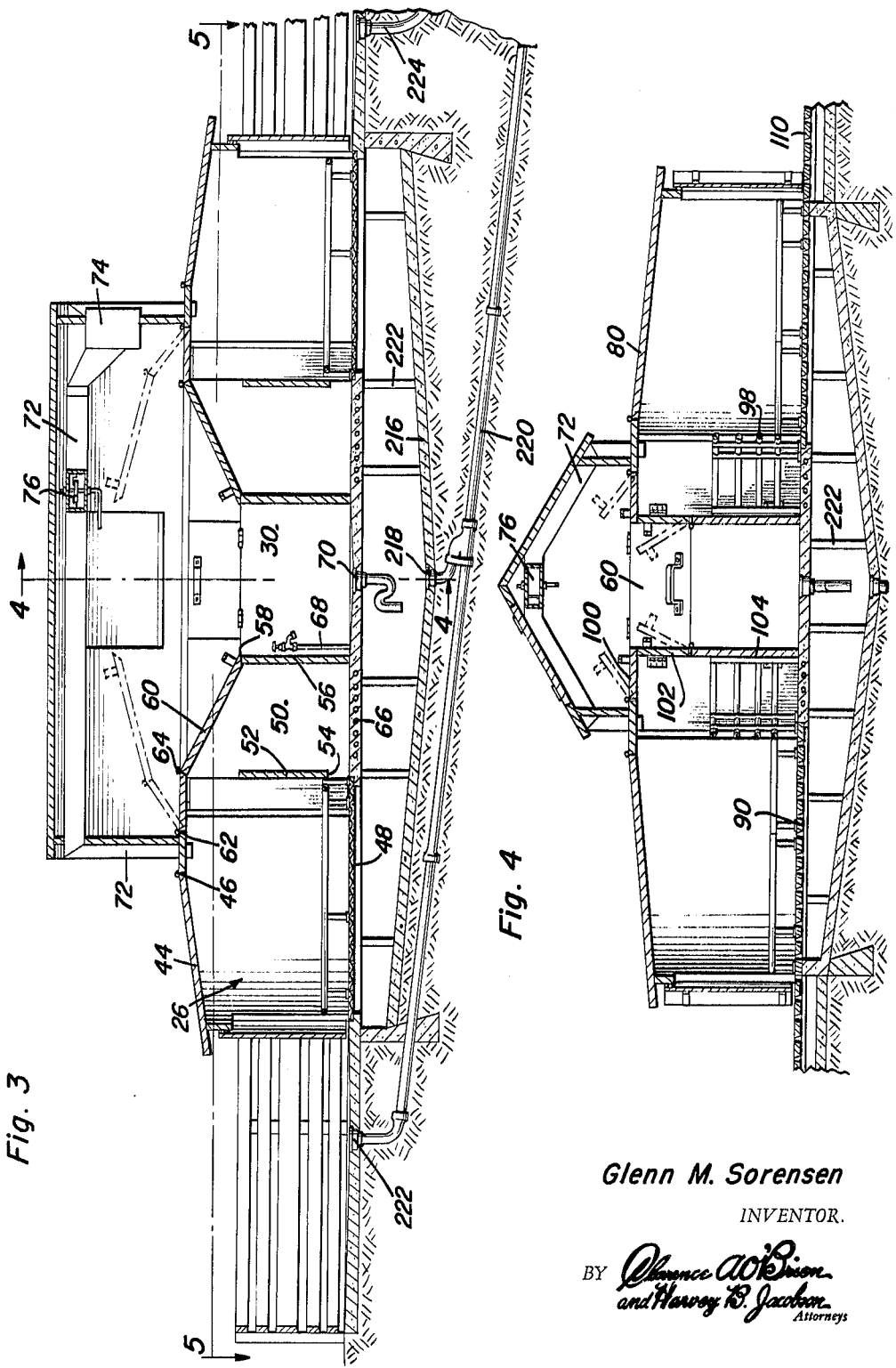

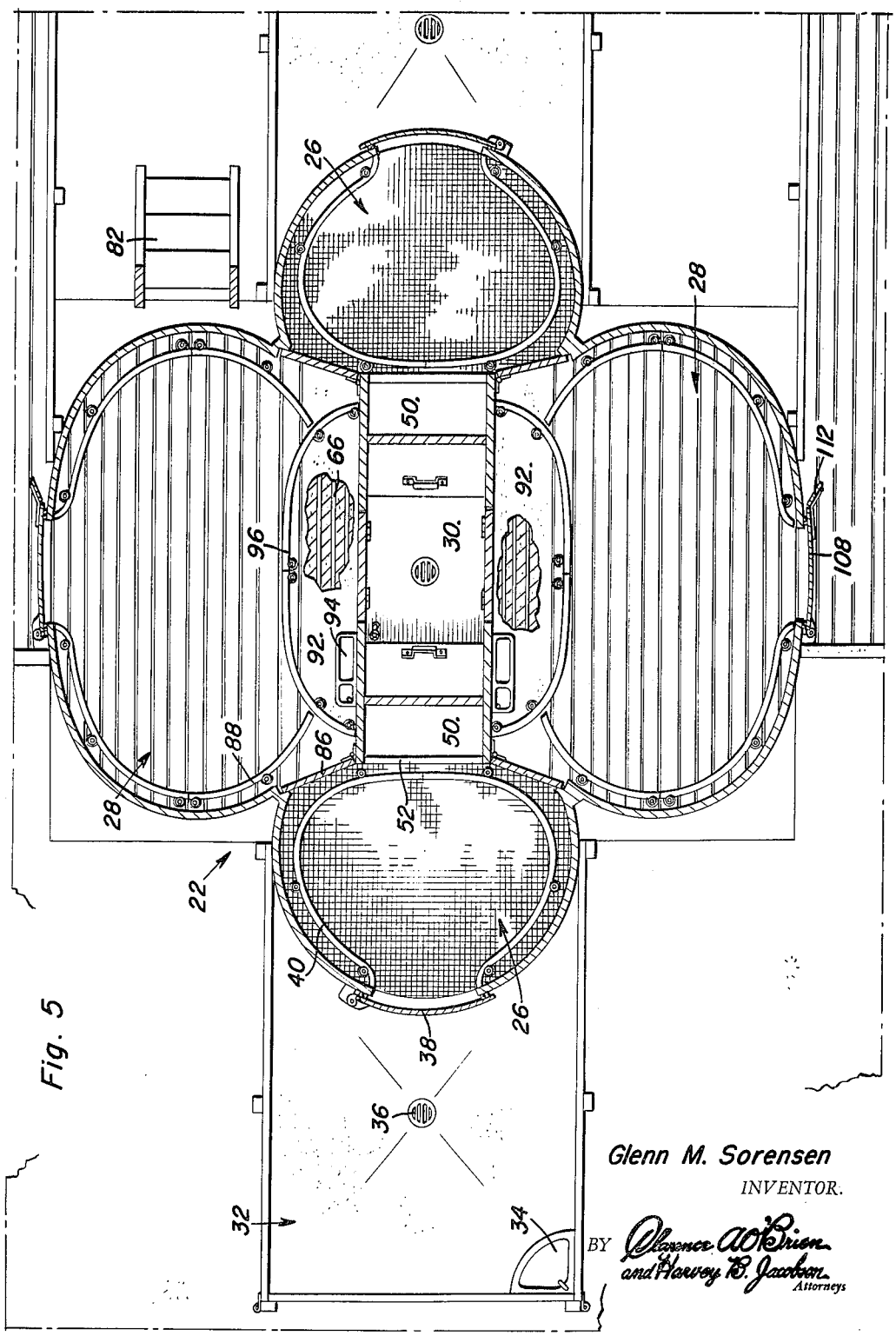

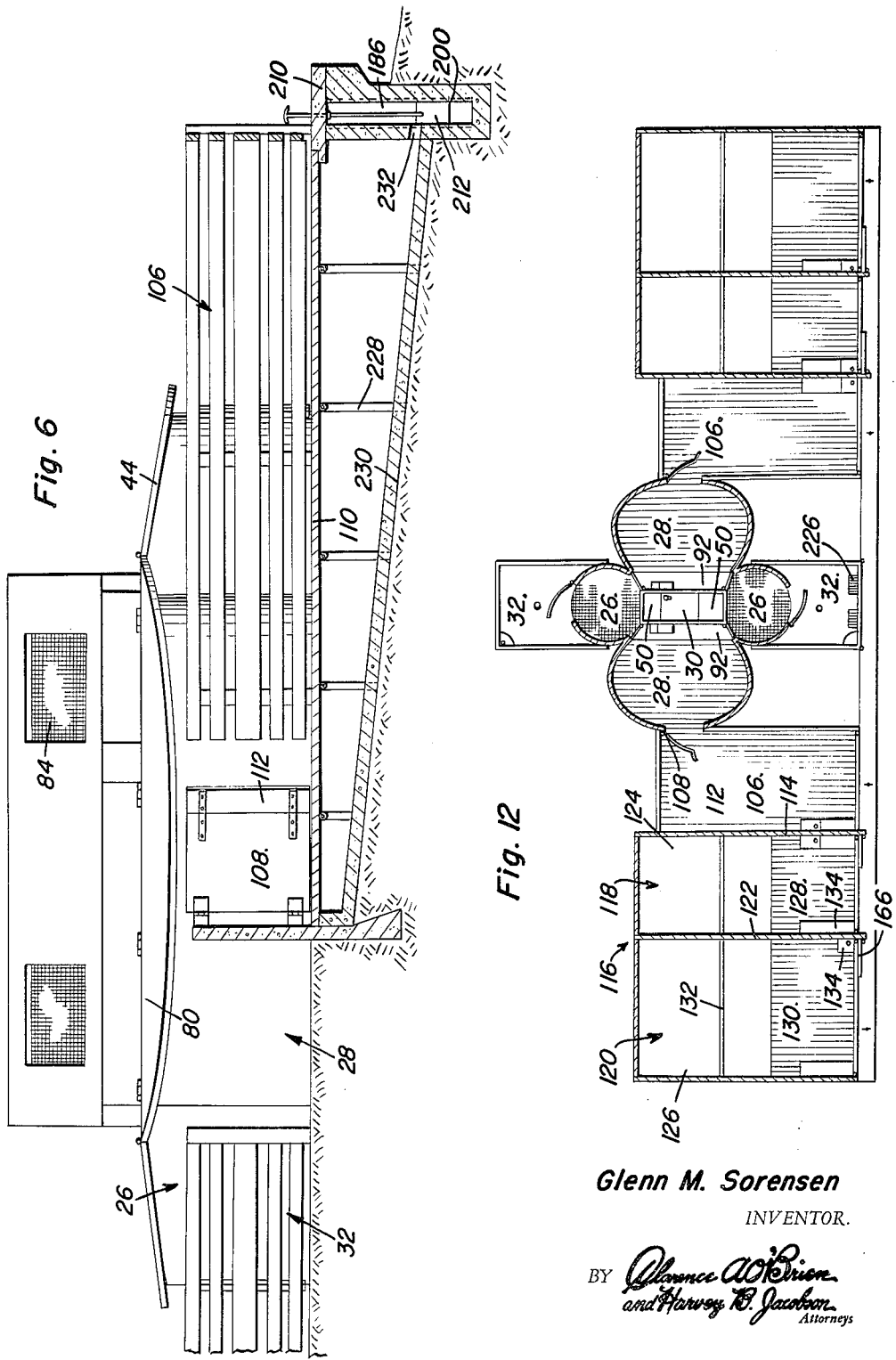

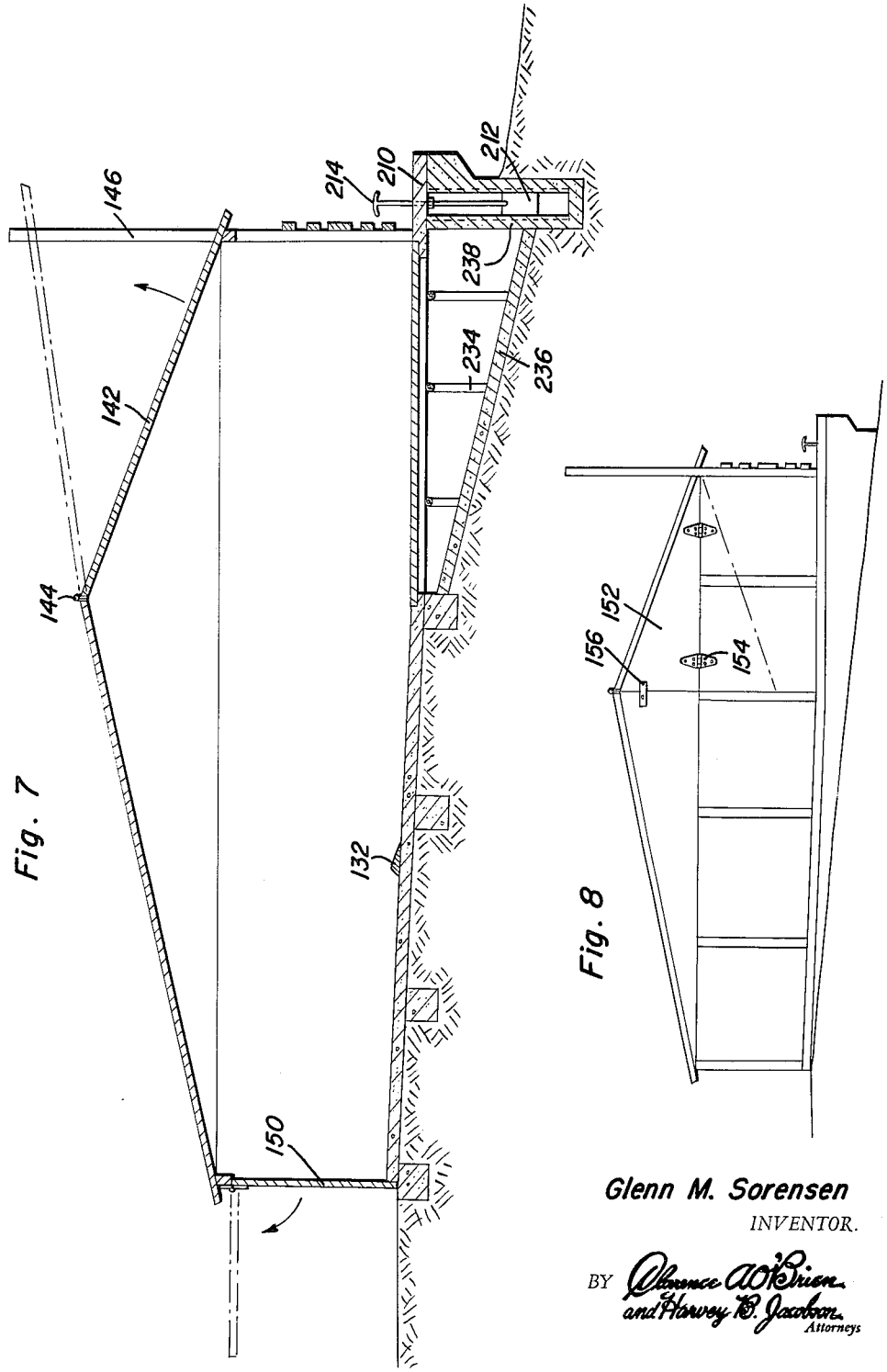

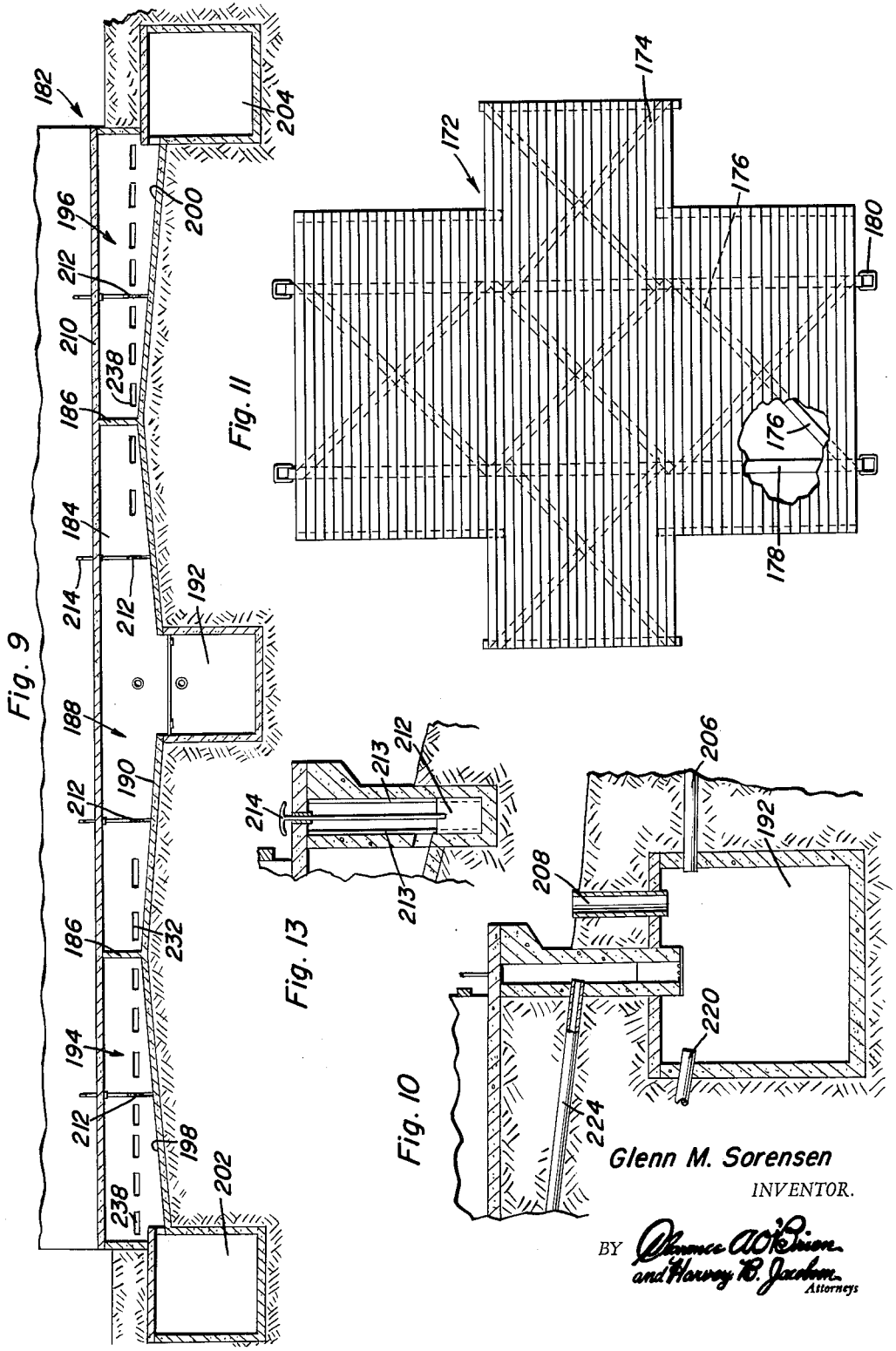

United States Patent Office 3,213,828
Patented Oct. 26, 1965

3,213,828
SWINE PRODUCTION UNIT
Glenn M. Sorensen, Cambridge, Nebr.
(R.R. 1, St. Edward, Nebr.)
Filed Oct. 18, 1962, Ser. No. 231,437
3 Claims. (Cl. 119—20)

The present invention generally relates to swine production units, and more particularly to a unit specifically designed for use in conjunction with a novel system of producing swine so as to result in a sound, trouble free, sanitary and highly efficient operation.

As will be appreciated by those familiar with the art, the raising of swine has in general been both a difficult and time-consuming operation involving the constant transporting of feed and water, the removal of manure, and the maintaining of the pens in a relatively clean condition. Further, because of rats, flies and lice, disease was generally uncontrollable with it not being uncommon to lose one-half of a herd before they reached market weight, and in some instances with the entire herd being wiped out. In more recent times, large confinement systems for the raising of swine have appeared throughout the country, however, these large systems, no two of which seem to be alike, involve an investment of considerable sums of money and are clearly beyond the means of the average farmer, and further, because of their size, are not in fact practical for use on the average sized American farm. Accordingly, it is one of the primary intentions of the present invention to provide a system whereby the small or average farmer can effectively compete with the large operations by providing a unit incorporating features which are considered the most valuable both from the view point of sound management practices and swine sanitation, while at the same time allowing the swine producer to start with a minimum investment and gradually build into an efficient confinement operation by adding onto the basic unit as the system begins to pay for itself.

In the production of swine there are three distinct areas or categories, (1) feeder pig production, (2) feeding pigs from weaning to market, and (3) complete farrowing to market operation. The feeder pig producers handle the sow herds and raise the pigs to weaning age (40 to 50 pounds), the feeders buy the pigs at weaning age and feed them out for market, and the farrowing to finish producers handle the complete operation. The system of the present invention involves the use of a novel unit capable of handling, in accordance with the recognized most effective methods, the complete farrowing to market operation, with the main unit having various sub-units capable of equally effectively being individually used for either the feeder pig production or the feeding of pigs from weaning to market. The flexibility of this system enables the average farmer, with a minimum investment, to start into the swine production business with a minimum amount of risk of the type normally plaguing the small operator because of the heretofore inability to provide the maximum in sanitary conditions without the investment of large sums of money. The farmer, in entering into swine production, can, for example, first purchase a portable farrowing to weaning unit, as the business progresses, a portable growing and finishing unit can be added, and finally, the portable units can be transferred to a permanent concrete floor incorporating the novel drainage system of the present invention.

In conjunction with the above, it is considered highly significant that an important object of the present invention is to provide a versatile system particularly adaptable to specific pathogen free swine production, production testing, feeder pig production, a complete farrow to finish confinement operation, and, if deemed desirable, a portable operation.

Likewise, it is an intention of the present invention to use the best in sound management practices of swine sanitation, these basically involving isolation, self-cleaning floors, liquid manure handling, protection from rodents, adequate space requirements, temperature control, ventilation, operation facilities, feeding equipment, pig brooders, and a minimum amount of movement of the swine combined with a maximum amount of comfort to the swine and operator.

Likewise, it is significant that the present unit is intended to reduce labor to a minimum, being uniquely suited to an automatic feeding system as well as an automatic watering system for drinking, cleaning and cooling.

Additionally, it will be appreciated that an object of the present invention is to enable a swine producer to start with a minimum investment and advance by steps to a complete confinement system of swine production thus putting the small scale operator into open competition with the large operators.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an over-all perspective view of the complete swine production unit comprising the present invention;

FIGURE 2 is a rear elevational view of the entire unit;

FIGURE 3 is an enlarged cross-sectional view taken substantially on a plane passing along line 3—3 in FIGURE 2;

FIGURE 4 is a cross-sectional view taken substantially on a plane passing along line 4—4 in FIGURE 3;

FIGURE 5 is a plan view of the farrowing to weaning unit;

FIGURE 6 is a sectional view taken substantially on a plane passing along line 6—6 in FIGURE 2;

FIGURE 7 is a cross-sectional view taken substantially on a plane passing along line 7—7 in FIGURE 2;

FIGURE 8 is an end elevational view of the entire unit comprising the present invention;

FIGURE 9 is a partial longitudinal sectional view taken substantially on a plane passing along line 9—9 in FIGURE 1 and illustrating a portion of the drainage system;

FIGURE 10 is an enlarged cross-sectional view taken substantially on a plane passing along line 10—10 in FIGURE 1;

FIGURE 11 illustrates a portable floor which may optionally be used to support the farrowing to weaning unit;

FIGURE 12 is a sectional top plan view on a reduced scale of the entire swine production unit as illustrated in FIGURE 1; and FIGURE 13 is an enlarged cross-sectional view through the drainage gutter illustrating the mounting of a baffle therein.

Referring now more specifically to the drawings, reference numeral 20 generally indicates the entire swine production unit comprising the present invention. This complete unit 20 consists essentially of a centrally located farrowing to weaning unit 22 and a growing and finishing unit 24 located on each side thereof. As will be gone into a greater detail subsequently, the sows and piglets, after farrowing, are progressively moved through the farrowing unit and one of the growing and finishing units with the entire operation being confined and with each section of the over-all unit being isolatable from the adjacent sections thus enabling the maintenance of a continuous operation without any danger of the transmission of disease.

With particular reference to FIGURES 3–5, it will be appreciated that the farrowing to weaning unit 22 consists basically of two farrowing pens 26 and two suckling pens 28 symmetrically orientated about a centrally located operating area or room 30, pens 26 and 28 and the operating area 30 intended to be completely enclosed, as will be appreciated from FIGURE 1, so as to maintain complete isolation and close temperature control during this vital stage of prodution. An open sow pen 32 is located directly outside each farrowing pen 26, these pens 32 containing both water troughs 34 and drains 36. A sow, prior to entry into the farrowing pen 26, is placed within the sow pen 32 and thoroughly cleaned with special attention given to washing the udders and feet. Subsequently, the sow enters into the farrowing pen 26 through the pivotally mounted door 38, the farrowing pens 26 being generally round so as to avoid unused corner space and facilitate the cleaning thereof. Further, each farrowing pen 26 is provided with a guard rail 40 positioned so as to provide protection for the piglets while allowing the sow to obey its natural nesting instinct, the farrowing pen 26 being of a size so as to not require the assumption of an unnatural or uncomfortable position during the farrowing period. The upper cover or roof of the farrowing pens 26 outwardly of the central raised portion 42 consists of enlarged lids 44 pivotally mounted as at 46 so as to allow a complete opening of the pens 26 for access thereto as will be necessary, for example, during the cleaning of the pens 26. In the particular embodiment illustrated in the drawings, the floors of the farrowing pens 26 have been shown as being of steel mesh 48, however, it will be appreciated that various other suitable types of floors can be used, the only requirement being that such floors be properly drained so as to prevent any accumulation of filth.

Located between each farrowing pen 26 and the central operating area 30 is a brooder 50 separated from the farrowing pen 26 by a partition 52, the lower edge 54 of which is spaced sufficiently above the floor level so as to allow free passage of the piglets into the brooder while preventing movement of the sow into the brooder 50. The brooder 50 is separated from the operating area by a partition 56 extending upwardly from the floor level and terminating in an upper edge 58 located in a plane substantially in line with the upper edge of the partition 52 which is in turn spaced below the plane of the highest point of the pen 26. In order to obtain access to both the brooder 50 and the farrowing pen 26 from the operating area 30, a closure 60, hinged at two points 62 and 64, is provided over the inner portion of the pen 26 and over the brooder 50, the necessity of having this closure 60 arising from the desirability of completely isolating each pen 26 and brooder 50 from the other sections as well as from the operating area. Inasmuch as heat will be needed particularly in the brooders 50, and especially during the winter, it is contemplated that a floor heating system 66 be provided, however, while such a floor heating system, of either the hot water or electrical heating cable type, is preferred, it will be appreciated that various other means can be used to heat both the brooder and the entire farrowing unit, as for example, electric heat lamps or small heating units, or in fact, a forced air heating system used in conjunction with an air conditioning system which the present invention also contemplates.

The operating area 30 is of a size so as to provide sufficient working area for the various operations which have to be performed on the piglets, with the location of the operating area 30 enabling the operator to maintain a close watch on the sows and piglets, each litter of piglets being capable of being worked on without disturbing the various other litters with the disturbance to the sow being reduced to a minimum because of the elimination of the necessity of having to climb over the sow to get to the piglets. The operating area 30 will of course also be provided with a suitable water supply 68 and drain 70.

It will be noted that the housing 42 over the operating area 30 and the inner portions of the pens 26 and 28 is raised relative to the pen covers, this providing sufficient head room for the operator and also providing room for the various ducts 72 used in conjunction with various types of suitable heating and air conditioning units 74, a suitable ventilator control 76 being accessible from inside the operating area. Access to the interior of the operating area 30 is provided through a roof trap door 78 easily accessible from the pivotally mounted lid 80 of the adjoining suckling pen 28, with the lid 80 being reached by stairs 82 provided at one side of the pen 28. Also, if so desired, windows 84 can be provided within both the pitched roof of the raised housing 42 and in the lids 44 and 80.

With reference to FIGURE 5, it will be noted that each suckling pen 28 is in communication with both farrowing pens 26 through pivotally mounted doors 86, each suckling pen 28 being of a size so as to comfortably accommodate two sows and their litters. Further, in order to afford protection to the piglets, an encircling guard rail 88 is provided, and further, so as to facilitate the maintaining of a sanitary environment, it is contemplated that the floor be constructed of a plurality of slats 90 spaced slightly from each other for purposes of drainage. So as to allow for the opening of the door 86 as well as the free passage of the sow from the farrowing pen 26 to the suckling pen 28, the guard rails 40 and 88 are removable, or at least that portion thereof in the vicinity of the doors 86. It will be course be appreciated that the making of the entire guard rail removable will greatly facilitate the cleaning of the various pens. It will be appreciated that such an arrangement enables the maximum utilization of the available space. Two sows, farrowing at substantially the same time in the two farrowing pens 26 are, after an interval of approximately one week, placed with their litters into one of the suckling pens 28 where they remain until weaning, approximately four to eight weeks. After the two sows and their litters are moved into one of the suckling pens 28, the two farrowing pens 26 are thoroughly cleansed and prepared for two more sows which go through the same procedure, however being moved into the opposite suckling pen 28. In connection with this movement of the sows and litters from the farrowing pens 26 into the suckling pens 28, it is also contemplated that the doors therebetween be left open for a few days so as to allow the sows and piglets to become gradually accustomed to their new surroundings thus reducing to a minimum any disturbance which might cause temporary pauses or setbacks in the rate of gain.

Each of the suckling pens 28 is also provided with a brooder 92 provided with the same heating means 66 used in the brooders 50. These brooders 92, provided with feed and watering means 94, are separated from the suckling pens 28 by partitions 96 consisting of a plurality of vertically spaced elongated bars 98, the lowermost bar being positioned above the floor level a sufficient distance so as to allow access of the piglets into the brooder 92 while preventing such movement of the sow. Access is obtained to each suckling pen 28 from the operating area 30 through a pair of doors 100 and 102, the door 100 pivoting upward and the door 102 pivoting downward as best seen in FIGURE 4, these doors 100 and 102 being usable either separately or together depending on the particular needs. It will also be appreciated that a solid partition 104 separates the brooder 92 from the operating area 30 thus completely isolating the operating area 30.

Located outwardly of the suckling pens 28 are open air suckling extension pens 106, accessible through a door 108 and being similarly provided with a slatted floor 110. This extension pen 106 provides additional area so as to enable more freedom of movement for the sows and pigs, the close care and hand feeding of the sows required in the farrowing pens 26 no longer being needed.

In warm weather, it is contemplated that the door 108 be left open, however, during inclement weather a conventional spring or weight mechanism is to be used so as to maintain the door closed, the door 108 being provided with an outwardly angled edge extension 112 so as to enable the sows to open the door from the extension pen side.

Positioned outwardly of each extension pen 106 by a solid partition wall 114 is a growing and finishing unit 116, this growing and finishing unit 116 consisting of a first growing area 118 and a second finishing area 120. The growing and finishing areas 118 and 120, separated by a solid wall 122, are generally similar in makeup with the finishing area 120 being slightly larger than the growing area 118. Both of these areas consist basically of a rear housing section 124 in the growing area 118 and 126 in the finishing area 120, these housing sections 124 and 126 sloping slightly downward and forward to forward sections 128 and 130 provided with a suitable drainage flooring, preferably spaced slats. In order to maintain the bedding for the pigs within the housing sections, a transversely extending ridge 132 can be provided. Both the growing area 118 and the finishing area 120 are provided with feed and watering means 134, as is in fact the extension pen 106.

Both the growing area 118 and the finishing area 120 are provided with roofs, the roof portions 136 and 138 over the housing sections 124 and 126 being fixedly secured with the roof portions 140 and 142 over the forward sections 128 and 130 being pivotally secured along the ridge 144 so as to allow for their opening for purposes of ventilating or cleaning the areas. These openable roof sections 140 and 142 being positionable in a variety of elevated positions by attachment to the vertical post 146 in any suitable manner. Also, it will be appreciated that these sections 140 and 142 can be opened fully and positioned in superimposed relationship on the fixed sections 136 and 138.

The rear walls 148 and 150 of the growing and finishing areas 118 and 120, also of a solid nature, are likewise to be pivotally secured along the upper edges 152 thereof so as to facilitate access to the interior of these areas for purposes of cleaning.

The outer walls of both the growing and finishing areas 118 and 120 are also of a solid nature with the upper forward portions 153 thereof being pivotally mounted by hinge means 154 so as to provide further means for ventilating these areas, a lock 156 of any suitable nature being used to maintain the sections 153 in a closed position.

The front walls 158 and 160 of both the growing area 118 and the finshing area 120 are formed of a plurality of vertically spaced slats capable of restraining the pigs while providing desirable ventilation. In order to avoid contact through these front walls by the pigs in the adjacent areas, it is contemplated that extensions 162 and 164, of a forwardly extending nature, be provided on the walls 114 and 122.

In order to allow passage of the pigs from one area to another, the front walls 158 and 160 are to be pivotally mounted at both ends thereof so as to enable their optional opening from either end. For example, when the pigs are to be moved from the growing area 118 to the finishing area 120, the adjacent ends of the walls 158 and 160 are unlatched and swung outwardly. As will be appreciated, this outward swinging of the two walls 158 and 160 will result in the provision of a space between the ends thereof, and accordingly, so as to prevent the movement of the pigs through this space while being transferred from one area to the other, an extension gate 166 is provided with this extension gate 166 being pivotally mounted so as to swing from a first position superimposed on the main gate or wall 158 or 160 to a second position closing off the space between the two adjacent walls. It will be appreciated that in moving the pigs from the extension pen 106 to the growing area 118, that substantially the same system is used with the slatted front wall 168 of the extension pen being pivotally mounted so as to enable its opening toward the growing area. Entry into the sow pens 32 is similarly provided by pivotally mounting the front wall 170 thereof. As was the case in regard to the movement of the pigs from the farrowing pen 26 to the suckling pen 28, the access way between the various areas are generally left open for at least a few days so as to enable the pigs to gradually become accustomed to their new environment.

Attention is now specifically directed toward FIGURE 11 wherein an example of a portable floor 172 has been illustrated, this floor, or one similar thereto, being used if the units of the present invention are to be portable. As will be appreciated from FIGURE 11, this portable floor 172 consits of a plurality of spaced slats 174 suitably interbraced by members 176 and mounted on longitudinally extending skids 178 for movement from one place to another, the skids 178 having attaching rings 180 thereon for engagement by a towing means. While the use of portable floors such as 172 will appeal to many operators, particularly those just getting started in swine production, the present invention also contemplates the use of a novel permanently installed drainage system 182 which eliminates the necessity of periodically moving the various pens from one field to another such as would be required in the use of the portable floors 172. This novel drainage system 182 consists essentially of an elongated gutter 184 running the full length of the entire swine production unit as illustrated in FIGURES 1, 2 and 12. This longitudinally extending gutter 184 is divided into three sections by vertically extending partitions 186, the center section 188 consisting of a floor 190 sloping downwardly from high points at both partitions 186 to a centrally located manure pit 192, and with the two end sections 194 and 196 having floors 198 and 200 therein sloping downwardly from a high point at the partitions 186 to downwardly and outwardly located manure pits 202 and 204. Each of the manure pits, as exemplified by the pit 192 in FIGURE 10, includes an overflow pipe 206 and a pipe 208 providing access to the manure pit by means of a suction pump hose for removing the manure therefrom for purposes of fertilization. The gutter 184 is additionally provided with a concrete slab top 210 having vertically extending baffles 212 frictionally engaged within opposed vertical grooves 213 in the walls of the sections 188, 194 and 196 and operable by a handle means 214 extending through the slab top 210 for the vertical adjustment of the baffle 212 thus enabling the cleansing of these sections by a flushing type action.

This flushing action is brought about by closing a baffle 212 thus forcing the level of the liquid to rise toward the top of the baffle. When a section of the gutter has been filled to the top of the baffle 212, the baffle will then be raised a short distance to produce the flushing action resulting in a carrying away of the sludge which settles to the bottom of the gutter. It will be noted that the baffle 212 is of a height so as to allow the liquid to flow thereover before any backflow through the drain openings will occur.

Also, it will be appreciated, that the drainage system partitions 186 are to correspond with the location of the pen dividing walls 114 with the farrowing to weaning unit 22, including the extension pens 106, draining solely into the center gutter section 188 and with each of the growing and finishing units 24 draining into one gutter side portion, either 194 or 196 thus preventing any contamination arising from the flow of drainage material.

With attention now being specifically directed toward FIGURES 3 and 4, it will be noted that the farrowing pens 26, suckling pens 28, and operating room 30 all drain into an inverted conically shaped concrete subfloor 216 having a drain 218 at the lowermost point thereof, this drain 218 communicating with a subjacent drain line 220 communicating directly with the manure pit 192, the floors of the farrowing pens, suckling pens and operating room being supported on a system of vertically and horizontally extending supporting pipes 222. This drainage line or pipe 220, as will be appreciated from FIGURE 3, has the rear portion thereof in direct communication with a drain 222 provided in the rear sow pen 32, the front sow pen 32 having a separate line 224 in direct communication with the gutter 184 above the manure pit 192. If so desired, the forward pit can drain directly into the gutter 184 through drainage portions indicated at the forward end thereof by reference numeral 226 in FIGURE 12.

The extension pens 106, have their drainage floors 110 supported by pipe standards 228 above a forwardly and downwardly sloping concrete sub-floor 230 providing a drainage directly into the gutter 184 through access openings 232 as illustrated in FIGURE 6.

With attention now directed to FIGURE 7, it will be noted that the forward sections 128 and 130 of both the growing area 118 and the finishing area 120 have the drainage floors therein also supported by pipe standards 234 above a forwardly and downwardly sloping concrete draining floor 236 communicating through openings 238 with the gutter 188. As will be appreciated, such an arrangement allows a continuous draining of the waste matter from the various pens and also it greatly facilitates the cleaning of these pens in a manner contemplated to enable the maintenance of a high degree of sanitation.

While not specifically limited thereto, it is considered that the swine production unit comprising the present invention will be best utilized by adhering to the following method. First, one sow is placed in each of the two sow pens 32 where they are thoroughly cleaned with special attention given to washing their udders and feet. The sows are then allowed to enter the farrowing pens 26 where they farrow and nurse the piglets until they are about one week of age. During this period the operator can keep a close watch over the sow, clip the pigs' needle teeth, give them a dose of iron and vitamins, ear notch them and castrate the male pigs if they are being raised for market. Next, the doors into one of the suckling pens 28 are opened and the two sows and litters turned together with the doors being left open for a few days so as to enable the pigs and sows to become accustomed to the new surroundings gradually. While the sows should be hand fed during their stay in the farrowing pen because of need for close care and varied rations at this time, once they are turned into the suckling pen they are allowed access to an exterior extension pen where both a self-waterer and feeder are located, a self-feeder and a self-waterer also being provided in the large brooder in conjunction with the suckling pen. A week or two before the next two sows are ready to farrow (about one month after the first two sows farrowed) the door between the farrowing pens and the one suckling pen are closed and sealed and the farrowing pens thoroughly washed out, steam cleaned and disinfected, the next two sows, subsequently farrowing in the farrowing pens and being moved into the second suckling pen 28. The first group of pigs farrowed will be weaning age (six to eight weeks) when the third set of sows are ready to move in and can be moved into the growing area 118 or sold as feeder pigs. This should be done in time for a thorough cleaning of of the area before the next group is ready to be moved in. At this point, a nursery house should be maintained on the side to care for weak or injured pigs. When the pigs are ready to wean and moved into the growing area 118, the sows are removed and put into breeding pens. As in the case between the farrowing pens and the suckling pens, the gate between the extension pen 106 and growing area 118 is left open for a few days so as to allow the pigs to become accustomed to their new surroundings thus avoiding any temporary stop in gaining. A few days before the next group of two sows and litters are allowed to enter the suckling pen and extension pen, the first group of pigs are closed off in the growing area and the suckling pen and extension pen are thoroughly cleaned and disinfected. The walls between the extension pen and growing area are to be solid, generally of concrete so as to prevent direct contact between the group of pigs. When the growing pigs are ready to be moved to the finishing area 120 (two to four months or 50 to 125 pounds) the gate between the growing area and finishing area is opened and remains open so as to allow a gradual growing accustomed to the new area. The pigs then remain in the finishing area until ready for market, approximately 200 to 225 pounds or four to six months of age.

Thus, it will be recognized that the present invention enables the handling of swine production in a small though highly efficient manner allowing the utilization of the acknowledged best management practices of swine sanitation which basically consist of isolation, self-cleaning floors, liquid manure handling, adequate space requirements, temperature control, ventilation, operator facilities, feeding equipment, pig brooders, and minimum movement of swine with maximum comfort to both the swine and the operator. Also, as will be recognized, the particular arrangement of units contemplated in the present invention allows the adaptation of many of the more advanced automatic feeding and watering systems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in swine production, a farrowing unit, said farrowing unit comprising a central operating area defining four sides, a first pair of brooders located adjacent a first pair of opposed ones of the four sides, a farrowing pen located outward of and adjacent to each one of said first pair of brooders, means for enabling movement of piglets between each farrowing pen and the adjacent brooder while preventing ingress of sows to the brooder from the farrowing pen, a second pair of brooders located adjacent the second pair of opposed ones of the four sides, an enlarged suckling pen located outward of and adjacent to each one of said second pair of brooders, means for enabling movement of piglets between each suckling pen and the adjacent brooder while preventing ingress of sows to this brooder from the suckling pen, all of said pens being completely segregated from each other and from the central operating area, each farrowing pen having a common wall with each suckling pen, a door means in each common wall for selectively communicating the adjacent farrowing and suckling pens for allowing free access therebetween, each of said pens including a peripherally positioned piglet protecting guard rail mounted therein, and closure means for enabling independent access to each combination brooder and pen from the operating area, each of said pens having an enclosing outer wall forming a substantial continuation of the outer walls of the adjacent pens so as to completely enclose and surround the farrowing unit, and top cover means overlying and substantially completely covering the pens and operating area.

2. The farrowing unit of claim 1 including two sow receiving pens positioned exteriorally of the enclosed structure, each receiving pen communicating with one farrowing pen.

3. The farrowing unit of claim 1 including two exterior extension pens, each positioned adjacent a suckling pen and communicating therewith through an access opening, a door means for selectively sealing said access opening and means enabling an opening of the door means by the sows, so as to provide free access between the suckling pen and the extension pen.

(References on following page)

References Cited by the Examiner

UNITED STATES PATENTS

| | | | |
|---|---|---|---|
| 436,902 | 9/90 | Osborn | 119—16 |
| 1,259,802 | 3/18 | St. John | 119—28 |
| 1,721,942 | 7/29 | Booher | 119—16 |
| 1,823,940 | 9/31 | Hoegermeyer | 119—16 |
| 1,858,699 | 5/32 | Bayley | 119—16 |
| 1,875,433 | 9/32 | Fitzpatrick | 119—16 |
| 1,876,503 | 9/32 | Hinsvark | 119—16 |
| 2,255,806 | 9/41 | Overson | 119—20 |
| 2,736,291 | 2/56 | Duff | 119—16 |
| 2,923,273 | 2/60 | Collins | 119—20 |
| 3,011,475 | 12/61 | Golay | 119—20 |
| 3,097,625 | 7/63 | Sievers | 119—16 X |
| 3,137,270 | 6/64 | Rigterink et al. | 119—16 |

FOREIGN PATENTS

| | | |
|---|---|---|
| 859,081 | 12/52 | Germany. |
| 1,005,309 | 3/57 | Germany. |

OTHER REFERENCES

American Livestock Journal, pp. 30–31, November 1961.

Illinois Research, p. 7, vol. 3, No. 3, Summer, 1961.

ABRAHAM G. STONE, *Primary Examiner.*

ALDRICH F. MEDBERY, T. GRAHAM CRAVER, *Examiners.*